Nov. 12, 1946. L. E. LIGHTON 2,410,952
HEAT TRANSFER CONSTRUCTION FOR ELECTROLYTIC CELLS
Filed Dec. 28, 1942

INVENTOR:-
LESTER E. LIGHTON
BY
ATTORNEY

Patented Nov. 12, 1946

2,410,952

UNITED STATES PATENT OFFICE 2,410,952

HEAT TRANSFER CONSTRUCTION FOR ELECTROLYTIC CELLS

Lester E. Lighton, Glenside, Pa., assignor to The Electric Storage Battery Company, a corporation of New Jersey Application December 28, 1942, Serial No. 470,391

7 Claims. (Cl. 136—161)

This invention relates to a heat transfer construction for electrolytic cells and more particularly to a heat transfer construction suitable for use with secondary batteries.

In numerous applications of secondary batteries it has been found desirable to provide some means for either heating or cooling the battery, as the case may be, to maintain the battery at the temperature most conducive to the obtaining of maximum output therefrom. Under present day conditions batteries are required which will operate under widely varying, extreme temperature conditions. This is particularly true of batteries of the starting, lighting and ignition type used in aircraft and motor vehicles. It is also true, but to a somewhat lesser degree, of batteries used in other installations where relatively high rate discharges are required for short periods of time.

Variations in temperature have a considerable effect upon the output of a storage battery. If the battery temperature is too low its capacity is reduced to a point that it will not function for its intended purpose. On the other hand high temperatures have the effect of greatly diminishing the expected life of a battery.

It is an object of this invention to provide improved means for either heating or cooling a storage battery, as desired, under the particular operating condition encountered.

It is a further object of this invention to provide a heat transfer construction which is relatively inexpensive and is simple in construction.

It is a further object of this invention to provide a heat transfer construction for a storage battery which takes into consideration the limited space requirements for battery installations, making it unnecessary to increase the size of battery to obtain increased performance at low temperatures.

Further objects and advantages of this invention will become apparent as the following detailed description proceeds and the features of novelty which characterize this invention will be set forth in the claims appended to and forming a part of this specification.

In accordance with this invention, there is provided a heat transfer construction in which the supporting ribs for the plates of a storage battery are utilized to form a circulating path for a heat transfer medium. In one form of this invention, particularly adapted for use in applications where height is at a premium but floor space is unlimited, the heat transfer device comprises a member adapted to be inserted in the bottom of a molded storage battery container. This member is provided with hollow ribs for supporting the plates of the storage battery element and means are provided for circulating a heat transfer medium through these ribs. For example, depending upon whether the battery is to be heated or cooled, warm or cold water will be circulated by means of a pump through the ribs. In a second form of this invention, suitable for use where height is unlimited, but floor area is at a premium, the heat transfer construction consists of a molded container having hollow ribs in the bottom thereof which are open on the lower side and a separate bottom secured to the container and having projections contacting the bottom wall of the container between the ribs formed therein to provide in conjunction with the hollow ribs a path for heat transfer medium. Suitable inlet and outlet means are provided in both constructions for connection to a source of heat transfer medium and in either form of this invention the medium may be circulated through the heat transfer construction in either a series path or plurality of parallel paths depending upon the position of the headers with respect to the channel forming ribs.

For a more complete understanding of this invention reference should be had to the following detailed description taken in conjunction with the accompanying drawing in which.

Figure 1:
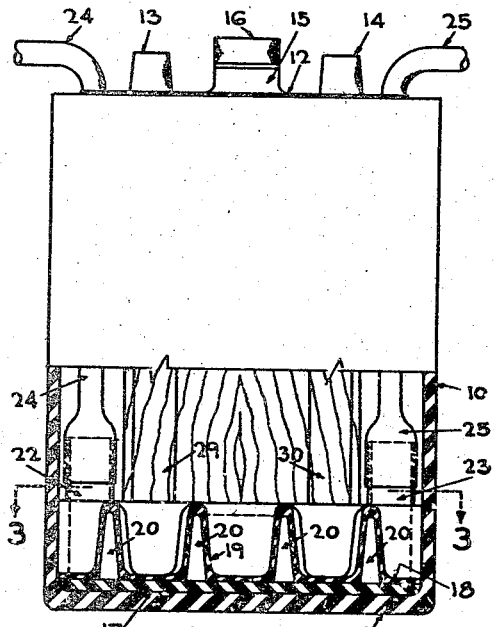
Figure 1 is an elevation partly in section of a storage battery having one form of the improved heat transfer construction of this invention, the section being taken on the line 1—1 of Figure 3.

Referring to the drawing, 10 represents a storage battery container having a flat bottom wall 11 and the usual cover 12. As is well understood in the storage battery art, battery elements (not shown) comprising groups of positive and negative plates will be supported within the container and these elements will be connected to terminal posts 13 and 14 projecting through the cover 12 for the battery casing. Furthermore, as is well understood in the art, the cover 12 will be provided with a suitable filling and venting opening 15 which is closed by a vent plug 16.

In accordance with this invention there is supported on the bottom wall 11 of the container 10 a heat transfer member which comprises a flat sheet 17 to which is secured a top sheet 18 having corrugations 19 therein which are of sufficient height to act as supports for the plate groups of the battery. The sheets 17 and 18 may be made of any suitable insulating and acid-resisting material but a mouldable composition is preferred. In this connection, it has been found that either hard rubber or a suitable synthetic resin such as vinyl, styrene or methacrylate resins or their compounds may be employed, polystyrene being preferred. With such plastic substances the top and bottom sheets are vulcanized, welded or cemented together in order to form fluid tight connections at the abutting portions thereof, i. e., the edges and between the corrugations of the top sheet. By means of this construction a plurality of hollow channels or passageways 20 are provided through which a fluid heat transfer medium may be circulated. It is to be particularly noted that, while these passageways serve as a path for a heat transfer medium, the walls defining the passageway also provide the customary supporting ribs employed in batteries of this type.

Figure 2:
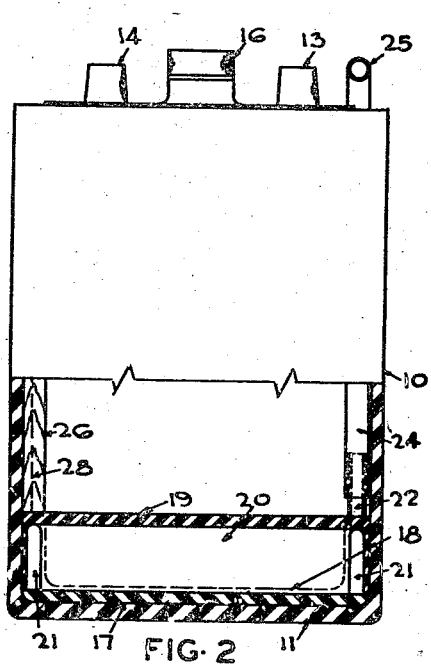
Figure 2 is a side elevation, partly in section, and with parts removed, of the construction shown in Figure 1, the section being taken on the line 2—2 of Figure 3.
Figure 3:
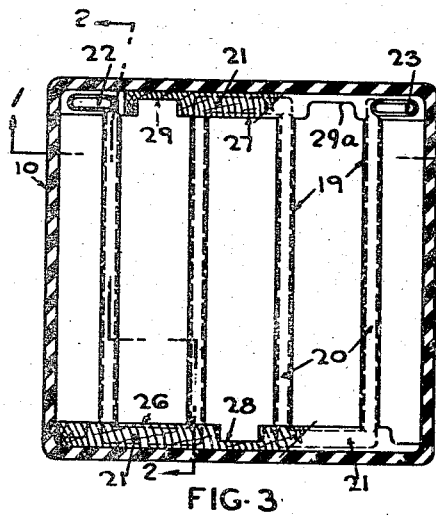
Figure 3 is a view partly in section taken on the line 3—3 of Figure 1.

Also formed in the upper sheet 18 at opposite ends of pairs of the ribs 19 are a plurality of header chambers 21 (see Figures 2 and 3). These header chambers are adapted to interconnect the passageways 20 so as to form a series path through the heat transfer member for the heat transfer fluid. Provided in opposite corners of the heat transfer member are inlet and outlet means, 22 and 23 respectively, which project vertically upward in the container 10, as shown in Figure 1. Connected to the inlet and outlet members 22 and 23 are suitable acid-resisting hose connections, 24 and 25 respectively, which extend up through the container 10 and out through the cover 12, as shown in Figures 1 and 2. These connections 24 and 25 are adapted to be connected to a suitable source of heat transfer fluid (not shown) which may be either a heating medium or a cooling medium, depending upon the use for which the battery is intended.

In applying the construction described above to a storage battery, it is to be observed that the header members 21 formed between adjacent passageways 20 produce a shelf in the bottom of the cell upon which sediment might collect during the operation of the battery. This sediment is usually in the form of active material which is washed from the plates of the battery elements and is likely to cause short-circuiting of plates of opposite polarity. Moreover, due to the fact that the fluid inlet and outlet members 22 and 23 provided in the heat transfer member take up certain space, which cannot except by special construction be occupied by the plate groups, spacer blocks are necessary to prevent movement of the elements relative to the container. As shown in Figures 1, 2 and 3, there is provided, in accordance with this invention, spacer blocks 26 and 27, at opposite sides of the container. These blocks are packed between the plate groups and the adjacent side wall of the container and are supported by the upper surface of the header portions 21 of the heat transfer member. They thereby prevent movement of the plate groups and effectively prevent the accumulation of any sediment on the header portions and the short-circuiting attendant such an accumulation.

In order to facilitate acid circulation within the container, the spacer blocks 26 and 27 are grooved in the spaces between adjacent header portions. More particularly, the spacer block 26 is grooved at 28 between the two adjacent header portions provided on one side of the container and the spacer block 27 is grooved at 29 between the header portion and the inlet portion 22 and at 29a between the header portion and the outlet portion 23 respectively.

The form of this invention illustrated in Figures 1, 2 and 3 is particularly suitable for installations in which floor area is not limited but height is a critical dimension. It is to be particularly observed that the construction illustrated adds very little to the height of the normal battery container. However, the length or width of the battery container must necessarily be increased to accommodate the heat transfer member which is located in the bottom thereof. These increased dimensions are due, to a considerable degree, to the fact that the fluid inlet and outlet connections are brought down into the container and the fact that header means must be provided in the heat transfer member in order to provide a continuous path therethrough. However, due to the grooving of the spacer blocks 26 and 27, some of this increase is utilized for increased electrolyte space and hence produces increased battery capacity.

In operation of the construction shown in Figure 1, the inlet and outlet connections 24 and 25 will be connected to a source of supply of a heating or cooling medium and this medium will be circulated through the passages 20 formed by the hollow rib members 19 to either add heat to the electrolyte of the storage battery or to take heat away from the electrolyte. In either case the medium circulated will serve to maintain the battery temperature at that which is most suitable considering the desired life and capacity of the battery.

It is to be observed that the construction illustrated in Figures 1 through 3 represents a single cell of a storage battery. It is obvious that when more than one cell is provided, a separate heat transfer unit may be located in the bottom of each cell and these units connected in series or parallel with the source of heat transfer fluid.

Figure 4:
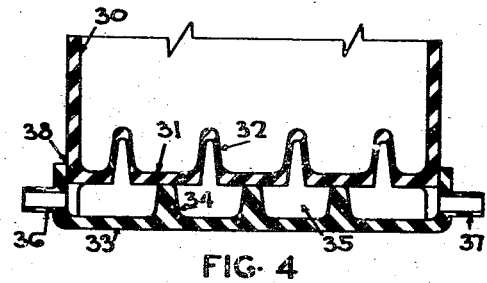
Figure 4 is a partial vertical elevation of a battery having modified form of this invention.

In Figure 4 there is illustrated a modified form of this invention. This particular form is particularly suitable where floor area is limited but there is no limitation on the height of a battery installation. Referring to Figure 4, 30 represents the container for the storage battery elements. This container is provided with a bottom wall 31 in which is integrally molded a plurality of hollow plate supporting ribs 32. As shown in Figure 4, these hollow ribs are open on the bottom. Secured to the bottom of the container 30 is a member 33 which is provided with a plurality of projections or ribs 34 adapted to engage the bottom wall 31 of the container between adjacent hollow ribs 32. These projections 34, together with the hollow ribs 32, form a plurality of heat transfer passageways 35 through which a heat transfer medium may be circulated. Provided in the member 33 are inlet and outlet means 36 and 37 respectively. The ribs 34 and the inlet and outlet means 36 and 37 may be so arranged that the passageways 35 are connected in either series or parallel to provide a series path or parallel path for the heat transfer medium. In the construction shown in Figure 4 the projections 34 and the inlet and outlet connections 36 and 37 are located so as to provide a series path for the heat transfer fluid.

As in the case of the construction shown in Figures 1 through 3, the container 30 and the member 33 will be made of a suitable plastic acid-resisting material and the two will be bonded together at 38 to provide a fluid tight connection therebetween. With the form of this invention illustrated in Figure 4 it is preferred to use a synthetic plastic material of the vinyl group. In this way both the container 30 and the member 33 may be molded and joined together at their various points of contact through the application of a suitable solvent or by means of heat and pressure.

While there has been shown and described particular embodiments of this invention, modifications thereof will be apparent to those skilled in the art. It is not desired, therefore, to limit this invention to the particular constructions shown and described, and it is intended in the appended claims to cover all modifications which come within the true spirit and scope of this invention.

I claim:

1. In a storage battery having plates, a container, a wall adjacent the bottom of said container having hollow ribs formed therein for supporting the plates within the container, a second wall secured in spaced relation to said first mentioned wall and located on the side thereof opposite to said plates to form with said hollow ribs a fluid path for the passage of a heat transfer medium, and fluid inlet and outlet means communicating with said fluid path and adapted to be connected to a source of supply of a heat transfer fluid.

2. In a storage battery having a container, plates and electrolyte, a heat transfer construction comprising a corrugated wall defining hollow ribs adapted to support the plates of said battery, said wall in contact with the electrolyte, a wall secured to the side of said corrugated wall opposite the plate-supporting side and cooperating with said corrugated wall to form a plurality of fluid passageways in alignment with and exposed to said ribs, and fluid inlet and outlet means connecting with said passageways and adapted to be connected to a source of supply of a heat transfer fluid.

3. In combination a storage battery container for receiving electrolyte and plate groups, said container having a relatively flat bottom wall, a heat transfer structure supported on said bottom wall and having upstanding hollow ribs for supporting the plate groups in said container and adapted to contact said electrolyte, header means in said structure for interconnecting said hollow ribs to form a fluid passageway, and fluid inlet and outlet means communicating with said passageway whereby a heat transfer medium may be circulated therethrough.

4. In a storage battery having a container for receiving electrolyte and plate groups and a cover for said container, a heat transfer structure supported in the bottom of said container having a plurality of upstanding hollow ribs adapted to support said plate groups in said container, header means for interconnecting said hollow ribs to form a fluid passageway, inlet and outlet means communicating with said fluid passageway, and means connected to said inlet and outlet means and projecting upwardly through said cell and out through said cover for connecting said passageway to a source of supply of a heat transfer medium, whereby a medium may be circulated through said passageway and said last mentioned means to heat or cool said battery.

5. In a container for a storage battery having plates, means for circulating a heat transfer medium comprising a corrugated wall in the container defining upstanding hollow ribs adapted to support the plates within said container, a second wall spaced from said corrugated wall and located on the sides thereof opposite to said plates and with said wall forming a space for receiving a heat transfer medium, ribs on said second wall projecting upwardly to engage the space between the corrugations on said corrugated wall so as to define with said hollow ribs a passageway for a heat transfer medium, and inlet and outlet means for connecting said passageway to a source of heat transfer medium.

6. In a container for a storage battery cell containing plate groups, means for circulating a heat transfer medium comprising a corrugated wall of the container defining upstanding hollow ribs adapted to support the plate groups and providing channels below said ribs for receiving a heat transfer medium, hollow header chambers disposed across the ends of said ribs for interconnecting said channels, said chambers formed with upwardly facing walls constituting ledges on which sediment is liable to deposit, and a spacer member disposed between the plate groups and the side wall of the container resting on said ledges and adapted to prevent deposit of sediment thereon.

7. In a storage battery, a container for receiving electrolyte and plate groups, a heat transfer structure in the bottom of said container comprising a corrugated wall defining hollow upstanding ribs adapted to support the plate groups, a wall cooperating with said corrugated wall to define with said ribs passageways for receiving a heat transfer fluid, hollow header chambers disposed across the ends of adjacent ribs for interconnecting said channels, said header chambers formed with upwardly facing walls forming ledges on which sediment may collect, spacer members disposed between the plate groups and the adjacent side wall of said container and resting on said ledges to prevent sediment deposit thereon, and grooves in said spacer members positioned to lie between the ledges formed by said header chambers for increasing the acid space in said cell and facilitating acid circulation.

LESTER E. LIGHTON.